United States Patent [19]

Lord et al.

[11] Patent Number: 4,925,287
[45] Date of Patent: May 15, 1990

[54] MIRROR ASSEMBLY FOR FACILITATING TRAILER HITCH ELEMENT ALIGNMENT

[76] Inventors: Barbara Lord, Apt. 205, 316-1st Ave. N.E., Calgary, Alberta, Canada, T2W 0B2; Tom Keightley, 1234 21 Ave. N.W., Calgary, Alberta, Canada, T2N 4R7

[21] Appl. No.: 264,546

[22] Filed: Oct. 31, 1988

[30] Foreign Application Priority Data

Dec. 14, 1987 [CA] Canada ........................ 554246

[51] Int. Cl.⁵ .................... B60R 1/08; G02B 7/18; G02B 5/10
[52] U.S. Cl. ........................ 350/632; 350/624; 248/467; 248/474; 248/486
[58] Field of Search ......... 350/632, 631, 618, 619, 350/622, 639, 621, 624; 248/467, 471, 472, 473, 474, 475.1, 476, 479–486

[56] References Cited

U.S. PATENT DOCUMENTS

| | | |
|---|---|---|
| 286,699 | 10/1883 | Hornberger ................ 248/471 |
| 328,740 | 10/1885 | Wiederer ................ 248/471 |
| 559,572 | 5/1896 | Devoe ................ 248/472 |
| 2,880,651 | 4/1956 | Fenyo ................ 248/467 |
| 3,295,914 | 1/1967 | Dietrich ................ 350/639 |
| 3,485,555 | 12/1969 | Morris ................ 350/623 |
| 3,524,701 | 8/1970 | Strohmeier ................ 248/476 |
| 3,704,063 | 11/1972 | Guthrie ................ 350/624 |
| 3,767,292 | 10/1973 | Rutkowski ................ 350/631 |
| 3,858,966 | 1/1975 | Lowell ................ 350/639 |
| 4,163,606 | 8/1979 | Granno ................ 350/639 |
| 4,624,539 | 11/1986 | King et al. ................ 248/467 |

Primary Examiner—Jon W. Henry
Attorney, Agent, or Firm—James D. Hall

[57] ABSTRACT

A mirror device to provide assistance for a vehicle driver when coupling a trailer to a vehicle. The mirror device includes a support having multiple legs which can be detached to the surface of the vehicle and which carry a mirror which can be oriented so as to provide a view of the trailer hitch parts carried by the vehicle and the trailer as they are brought into engagement during the coupling operation.

7 Claims, 1 Drawing Sheet

MIRROR ASSEMBLY FOR FACILITATING TRAILER HITCH ELEMENT ALIGNMENT

The present invention relates to an improved mirror assembly which can be mounted on a vehicle to aid a driver in aligning and positioning a trailer hitch mounted on the vehicle with a complementary socket mounted on the tongue of a trailer.

BACKGROUND OF THE INVENTION

A number of mirror assemblies have been patented which are deisgned to aid a driver of a vehicle in hitching the vehicle to a trailer, without the assistance of a second party in aligning the trailer hitch mechanism on the vehicle with the complementary socket on the tongue of the trailer. One especially complex example of these prior art devices is disclosed in U.S. Pat. No. 3,858,966 issued to Lowell on Jan. 7, 1975. This patent describes an apparatus which mounts on a trailer jack stand and includes a direction indicating arrow, a mirror and a retractable link of spring steel material which interconnects the vehicle and the apparatus. The retractable link serves to maintain the mirror in alignment with the rear of the vehicle in order to provide the driver with a better view and to pivot the direction indicating arrow, providing an idea of the angle of approach of the vehicle to the trailer. As the vehicle approaches the trailer, the retractable link is rewound on a spring loaded reel. More typical of these prior art devices is U.S. Pat. No. 3,525,701 issued to Strohmeier on Aug. 18, 1970. This patent teaches a convex mirror attached to an angled mount which is in turn attached by a magnet to the jack post of a trailer. The magnet retains the mirror in its position until the hitching process is complete. In addition, U.S. Pat. No. 3,767,292 issued to Rutkowski on Oct. 23, 1973 describes a similar device having a bracket which supports a reflective chrome plated hub cap in a position which permits the driver of a vehicle to view a trailer hitch reflected in the hub cap as he backs the vehicle toward a trailer. The bracket which supports the hub cap is designed to connect to propane gas tanks, which are traditionally mounted on the tongue of recreational trailers.

All of the above mentioned inventions share at least two common disadvantages. Firstly, they are all designed to connect to a trailer having either a jack post or tongue mounted propane tanks. Secondly, they are without exception suitable only for use with an automobile or a similar sized vehicle because of the length and fixed angle of their mirror mounts.

It is an object of the invention to overcome these problems of the prior art.

SUMMARY OF THE INVENTION

The invention provides a novel mirror assembly and a novel approach to the problem of single-handedly hitching a trailer to a towing vehicle. In accordance with the present invention, a mirror is mounted on a towing vehicle rather than on the tongue of a trailer as traditionally practised. The assembly may be quickly attached to almost any type of vehicle, and it may be used to assist in coupling a vehicle with any type of trailer, regardless of whether the trailer is provided with a jack stand, propane tanks, or other mounting points which are principally common to recreational type trailers only. Thus, according to the present invention, there is provided an apparatus for aiding an unassisted driver in coupling a trailer, the apparatus including a pair of supporting legs fitted with adhesive feet and a supporting arm for adjustably retaining a mirror. The mirror may be either flat or convex and may be magnifying or normal in its power of reflection. The mirror assembly may be mounted, as circumstances warrant, on either a towing vehicle or a trailer and is used in co-operation with a rearview mirror in the towing vehicle to provide a view of the trailer hitch parts as they are brought into proximity during the trailer coupling operation.

In more general terms, the preferred embodiment of the invention comprises an apparatus for assisting a vehicle driver in coupling a trailer and a towing vehicle, the apparatus including:
a mirror;
a mirror base having two or more legs pivotally connected to form a multi-pod structure, each leg having a foot member at its free end adapted to detachable adhere to a surface of the vehicle or the trailer; and
a mirror support assembly upon which the mirror is mounted, the support assembly being pivotally mounted upon the base to enable orientation of the mirror as required and means for inhibiting the movement of the assembly relative to the base to maintain the required orientation.

BRIEF DESCRIPTION OF THE DRAWINGS

The invention will now be described further by way of example only and with reference to the accompanying drawings wherein.

DESCRIPTION OF THE PREFERRED EMBODIMENT

Figures 1, 2, 3, 4:
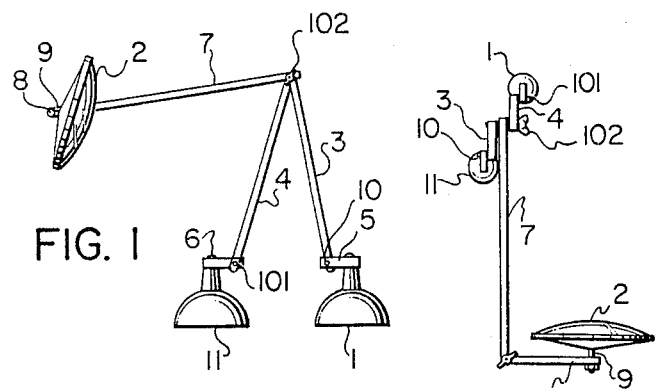
FIG. 1 is a perspective view of a preferred embodiment of the invention.
FIG. 2 is a perspective plan view of the embodiment of FIG. 1.
FIG. 3 is a schematic view of a station wagon type vehicle provided with the mirror of FIG. 1 to assist the driver in coupling a recreational type trailer.
FIG. 4 is a schematic view of an automobile equipped with the mirror of FIG. 1, in the process of coupling with a standard two wheel utility trailer.

As shown in the drawings, FIG. 1 illustrates a perspective view of one embodiment of the invention. A pair of suction cupped feet 1 and 11 are rigidly connected to brackets 5 and 6 which are in turn connected to supporting legs 3 and 4 respectively. Brackets 5 and 6 are attached to legs 3 and 4 by bolts and wing nuts 10 and 101 respectively so that members 5 and 6 may be rotated about bolts 10 and 101 and assume any angle in relation to legs 3 and 4. Members 5 and 6 may then be retained in their positions by tightening the wing nuts on bolts 10 and 101. The opposite ends of support legs 3 and 4 and one end of a supporting arm 7 are pivotally interconnected by a bolt 102 which is provided with a wing nut. The legs 3 and 4 and arm 7 may be locked in position by tightening the wing nut on bolt 102 when the respective legs and supporting arm are configured in a chosen relationship. A second mirror support arm 8, attached to support arm 7 and held in that position by a bolt provided with a wing nut, supports a mirror 2 via a standard mirror swivel bracket 9, shown in FIG. 2. Although bolts and wing nuts are employed in the preferred embodiment of the invention for interconnecting the parts of the mirror assembly and inhibiting the movement of the various parts about their axes of rotation, friction joints or ball and socket joints could also be gainfully employed. The mirror 2 is preferably a magnifying convex mirror, however, a normal flat mirror of substantial size has proven to be adequate and effective for most applications. Although the preferred embodiment of the invention described herein has a bipod base, any multi-pod structure would be equally as effective for attaching the apparatus to a surface of a vehicle or a trailer. The bipod base was chosen as the preferred embodiment because of its economy of construction and simplicity of use. The suction cupped feet 1 and 11 of the preferred embodiment of the invention could also be replaced by magnetic feet coated with a nonabrasive material to prevent the magnets from scratching the surfaces of a vehicle. Such magnetic feet would offer the advantage of adhering to textured surfaces unsuitable for suction cups, if the surfaces were underlaid with ferrous metals, however, they would be ineffective in the attachment of the mirror assembly to fiberglass or other non-ferrous materials increasingly used as structural components in vehicles.

As will be apparent from the foregoing description, the preferred embodiment of the invention may be attached to practically any smooth surface by pressing the rubber suction feet against such surface until adequate suction is obtained. It is thereby attachable to nearly any automobile, truck, tractor or to a trailer itself, including most trailer tongues. The invention therefore provides a device which is easily moved from one application to another and quickly adapted for use with any type of trailer/towing vehicle combination. In this respect, the present invention offers a distinct advantage over prior art mirror assemblies which are serviceable with specific types of trailers only and suitable for use with only certain types of vehicles.

FIG. 4 illustrates the apparatus of the invention mounted on a station wagon type of vehicle 14 which is being hitched to a standard recreational type trailer 13. In order to adjust the apparatus for the hitching operation, the suction feet 1 and 11 are stuck to the rear door of the station wagon, generally referred to by reference 14. The wing nuts on bolts 10, 101 and 102 (see FIG. 1) are loosened just enough to allow the legs 3 and 4 and support arm 7 to be swivelled to their required positions with a reasonable amount of force. The mirror is thus rotated into an approximate position of alignment and the operator later makes any final adjustments required to obtain a clear view of the trailer hitch by adjusting the rearview mirror in the vehicle (not illustrated). FIG. 2 shows the vehicle 14 approaching the trailer 13 but not yet in a position where both the ball and socket of the hitch have come to view. In this position the driver is approaching the trailer by sighting at the midpoint of the trailer itself. As soon as the trailer hitch socket enters the view range of the mirror 2, the final alignment is performed by reference to the mirror image alone.

FIG. 3 illustrates the apparatus of the invention mounted on a standard sedan type automobile, generally referred to by the numeral 15. The apparatus is attached to the vehicle by pressing the suction cup feet 1 and 11 to the trunk lid using, as described above. Wingnuts 10, 101 and 102 are loosened enough that adjusting legs 3, 4, and brackets 5, 6 and arm 7 may be moved into a position which places the mirror 2 in a favourable relationship with the rearview mirror (not illustrated) of the vehicle. The automobile 15 is being coupled with to a standard utility trailer 16. It should be noted that the devices of the prior art described above would not be serviceable in this situation because there are no jack stands, propane tanks, or other mounting surfaces on the tongue of this type of trailer.

Of course, the apparatus of the present invention may also be attached to the tongue of most trailers, to the propane tank of a recreational vehicle or to any surface which provides an adequate gripping surface for the adhesive feet 1 and 11.

Changes and modifications in the specifically described embodiments can be carried out without departing from the scope of the invention which is intended to be limited only by the scope of the appended claims.

The embodiments of the invention in which an exclusive property or privilege is claimed are defined as follows:

1. An apparatus for assisting a vehicle drive in coupling a trailer and a towing vehicle, said apparatus comprising:
   a mirror;
   a mirror base having two or more legs pivotally connected to form a multi-pod structure, each leg having a foot member at its free end;
   means for detachably securing each foot member to a surface of said vehicle or said trailer;
   a mirror support assembly upon which said mirror is mounted, said support assembly being pivotally mounted upon said base to enable orientation of said mirror as required; and means for inhibiting the movement of said assembly relative to said base to maintain said required orientation.

2. An apparatus as in claim 1 wherein said mirror base is a bipod base.

3. An apparatus as in claim 1 wherein said mirror support assembly comprises first and second interconnected members pivotally connected at corresponding ends, said first member being pivotally connected to said base at its opposite end;
   said mirror being pivotally connected to the opposite end of said second member;
   means for inhibiting the movement of said second member relative to said first member; and
   means for inhibiting the movement of said mirror relative to said second member.

4. An apparatus as in claims, 1, 2 or 3 wherein said means for detachably securing each foot member is a suction type foot, said foot being pivotally connected to the free end of each leg of said base and means for inhibiting the movement of said foot in relation to said leg.

5. An apparatus as in claims 1, 2 or 3 wherein said mirror is a convex mirror.

6. An apparatus as in claims 1, 2 or 3 wherein said mirror is a convex mirror.

7. An apparatus for assisting a vehicle driver in coupling a trailer and a towing vehicle, said apparatus comprising a mirror, a mirror base having at least two legs pivotally connected to form a multi-pod structure, each leg having a foot member at its free end, means for securing each foot member to a surface of said vehicle or trailer, a mirror support assembly upon which said mirror is mounted, said mirror support assembly including first and second interconnected members pivotally connected at their corresponding ends, said first member being pivotally connected to said mirror base at its opposite end, said mirror being pivotally connected at the opposite end of said second member to enable orientation of said mirror as required relative to said mirror base, means for inhibiting movement of said second member relative to said first member, and means for inhibiting movement of said mirror relative to said second member.

* * * * *